(12) United States Patent
Yashima (10) Patent No.: US 6,952,337 B2
(45) Date of Patent: Oct. 4, 2005

(54) VARIABLE CAPACITOR

(75) Inventor: Yukihiko Yashima, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/990,321

(22) Filed: Nov. 16, 2004

(65) Prior Publication Data

US 2005/0122660 A1 Jun. 9, 2005

(30) Foreign Application Priority Data

Nov. 17, 2003 (JP) .......................... P2003-386956

(51) Int. Cl.⁷ .............................................. H01G 7/00
(52) U.S. Cl. .................. 361/277; 361/278; 361/283.3; 361/281; 361/290; 361/292
(58) Field of Search .............................. 361/277, 278, 361/280, 281, 287, 283.3, 290, 292, 298.2

(56) References Cited

U.S. PATENT DOCUMENTS 6,543,286 B2 * 4/2003 Garverick et al. ........ 73/514.18
6,690,251 B2 * 2/2004 Toncich ...................... 333/202
6,705,165 B2 * 3/2004 Garverick et al. ........ 73/514.18
6,833,985 B2 * 12/2004 Fujii et al. .................. 361/281
6,856,499 B2 * 2/2005 Stokes ........................ 361/277

FOREIGN PATENT DOCUMENTS

JP 11-260667 9/1999

* cited by examiner

Primary Examiner—Dean A. Reichard
Assistant Examiner—Nguyen T. Ha
(74) Attorney, Agent, or Firm—Hogan & Hartson LLP (57) ABSTRACT

A variable capacitor is provided such that it is possible to make nonlinear distortion small and use at high power handling capability, and such that a variable rate of capacitance is not influenced by a high-frequency voltage substantially. A variable capacitor is used by changing capacitance through application across electrodes of direct current voltage and high-frequency voltage. When an effective voltage value of high-frequency voltage is within a range of voltage values of direct current voltage, there is substantially no fluctuation caused by application of high-frequency voltage with respect to a change of capacitance caused by application of direct current. Since it is possible to decrease susceptibility to the high-frequency voltage of the variable capacitor, it is possible to obtain a variable capacitor such that nonlinear distortion is small and power handling capability is high.

5 Claims, 6 Drawing Sheets

VARIABLE CAPACITOR

BACKGROUND OF THE INVENTION

1. Field of the Invention

The present invention relates to a variable capacitor that operates with a low voltage, more specifically, relates to a variable capacitor such that an influence of a capacitance change caused by a high-frequency voltage is small. Further specifically, the invention relates to a variable capacitor that is capable of maintaining a variable ratio of capacitance caused by direct current voltage even when a high-frequency voltage increases and is capable of limiting nonlinear distortion.

2. Description of the Related Art

Since before, there are variable capacitors that change capacitance through application of a direct current voltage, one of which uses a varactor diode, and the other of which uses a thin film capacitor utilizing a change of a dielectric constant.

The variable capacitor that uses a varactor diode changes capacitance through application of a reversed bias to a diode. The diode is used for a rectification circuit or the like by utilizing that an electric current flows when a bias is applied to a PN junction plane in a forward direction. The PN junction plane has a region referred to as a depletion layer in which either electrons or holes do not exist. When a reverse bias is applied to the diode, the depletion layer becomes thicker because both the electrons and the holes are pulled in a direction away from the PN junction plane, and the thickness of the depletion layer changes depending on the magnitude of the reverse bias. The depletion layer can be regarded as a dielectric. Therefore, in the case of applying a reverse bias to the diode, the thickness of the dielectric changes depending on the magnitude of the reverse bias, with the result that it is possible to use as a capacitor that changes capacitance. Moreover, the varactor diode has merits that it can be supplied at a low price because of a structure suitable for mass production using a semiconductor process, and furthermore, a variable amount of capacitance is large.

Figure 6:
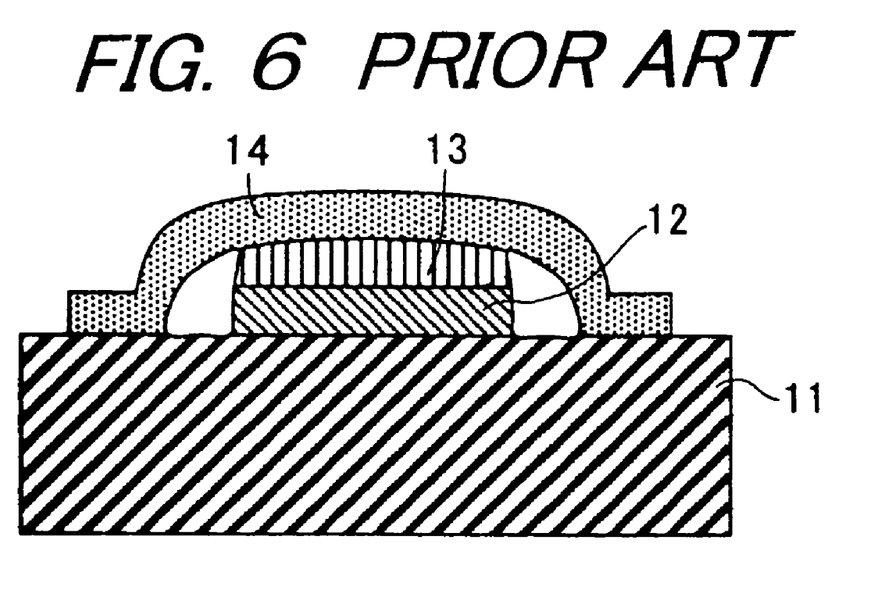
FIG. 6 is a cross section view showing an example of a conventional variable capacitor.

The variable capacitor that uses a thin film capacitor utilizing a change of a dielectric constant utilizes that a dielectric constant of a dielectric depends on an external electric field, and such an example as shown by a cross section view in FIG. 6 is proposed in Japanese Unexamined Patent Publication JP-A-11-260667 (1999). In the example shown in FIG. 6, a lower electrode layer 12, a dielectric layer 13 and an upper electrode layer 14 are sequentially deposited and formed on a supporting substrate 11. In contrast, a conductor layer to become the lower electrode layer 12 is deposited and formed on a substantially whole surface of the supporting substrate 11, and thereafter, pattern processing is executed to form the lower electrode layer 12 having a predetermined shape. Next, the dielectric layer 13 is formed on the lower electrode layer 12. The dielectric layer 13 is formed by putting a mask in a predetermined position and using a thin film technique, or formed on a substantially whole surface by a spin coat method, and thereafter, executing patterning to a predetermined shape. Heat curing is executed if necessary. The upper electrode layer 14 is formed by forming a conductor layer to become the upper electrode layer 14 on the dielectric layer 13, and thereafter, executing pattern processing. In the dielectric layer 13, a facing region sandwiched by the lower electrode layer 12 and the upper electrode layer 14 actually becomes a capacitance generation region.

Then, the dielectric constant of the dielectric layer 13 in the capacitance generation region is changed by an external control voltage supplied across the lower electrode layer 12 and the upper electrode layer 14.

Accordingly, assuming an area of the facing region between the electrode layers 12, 14 and the thickness of the dielectric layer 13 are fixed, it is possible to make the value of capacitance obtained between both the electrode layers 12, 14 variable by making the external control voltage to be a predetermined voltage. Thus, according to the thin film capacitor utilizing a change of the dielectric constant of the dielectric layer 13, it is possible to form a variable capacitor with a high variable amount and a high Q by selecting a dielectric material forming the dielectric layer 13.

Figure 7:
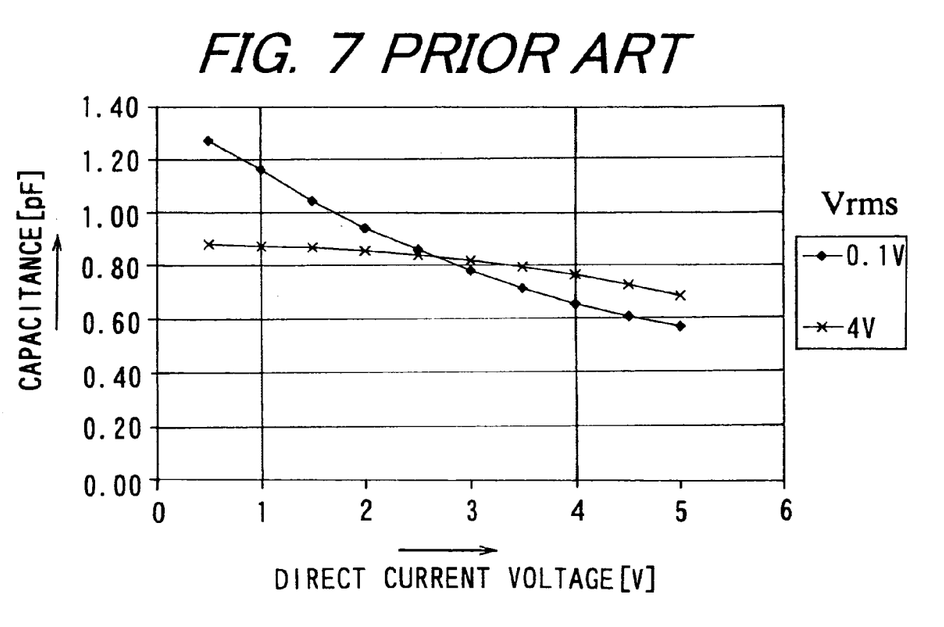
FIG. 7 is a chart showing a voltage dependence of capacitance in the conventional variable capacitor.

Both the variable capacitor using a varactor diode and the variable capacitor using a thin film capacitor utilizing a change of a dielectric constant described before exhibit a voltage dependence of capacitance as shown by a chart in FIG. 7. In the chart of FIG. 7, the horizontal axis represents a direct current voltage (unit: V) of the external control voltage, the vertical axis represents capacitance (unit: pF), black diamond points and a characteristic curve thereof show a change of capacitance when an effective voltage Vrms of a high-frequency voltage of the external control voltage is 0.1 V, and cross points and a characteristic curve thereof shown a change of capacitance when the effective voltage Vrms of the high-frequency voltage is 4 V. As apparent from the voltage dependence of capacitance shown in FIG. 7, regarding a change of capacitance caused by application of direct current voltage, when a high-frequency voltage is repeatedly applied, capacitance largely changes in accordance with application of a direct current voltage when the effective voltage Vrms of the high-frequency voltage is as low as 0.1 V. In contrast, the change caused by application of direct current voltage is small when the effective voltage Vrms of the high-frequency voltage is as high as 4 V. In other words, in a case where the high-frequency voltage Vrms of a low effective voltage value is, for example, as low as 0.1 V, capacitance decreases in a monotone when a voltage value of the direct current voltage becomes large, and a large change amount can be obtained. In a case where the high-frequency voltage Vrms of a high effective voltage value is, for example, 4 V, there is a problem such that a direct current voltage dependence of capacitance becomes small. When the direct current voltage dependence of capacitance becomes small in this way, the amount of change of capacitance to the external control voltage becomes small, so that a variable width of a variable filter, a variable matching circuit or the like utilizing the change amount becomes small, and consequently, a desired variable width of the variable filter, and variable matching circuit or the like cannot be obtained.

Further, in the variable capacitor described before, a response of capacitance to the external control voltage is not in a linear relation (first-order), but in a nonlinear relation containing a term of a high order. Nonlinear distortion caused by the nonlinear component is large, and there is a problem such that IIP3 serving as one index is 30 dBm, which is less than a practical level (for example, 50 dBm).

Furthermore, in the variable capacitor described before, there is a problem such that when high-frequency electric power to be allied is increased, dielectric breakdown of a capacitive element easily occurs, and such that electric power that electric breakdown occurs is as low as approximately 15 to 20 dBm, that is, so-called power handling capability is low.

Still further, there is also a problem such that a capacitance value changes depending on the magnitude of high-frequency electric power, and such that a variable width of capacitance changes depending on the magnitude of high-frequency electric power.

SUMMARY OF THE INVENTION

The invention has been devised in view of the above-described problems with the related art, and accordingly its object is to provide a variable capacitor such that nonlinear distortion is small and power handling capability is high.

Further, another object of the invention is to provide a variable capacitor such that an expensive boosting circuit is not used, a current voltage supply circuit can be small-size and low-price, nonlinear distortion is small and power handling capability is high.

Still further, still another object of the invention is to provide a variable capacitor such that a Q is high, nonlinear distortion is small and power handling capability is high.

Still further, still another object of the invention is to provide a variable capacitor such that the price is low, nonlinear distortion is small and power handling capability is high.

The invention provides a variable capacitor comprising: electrodes, the variable capacitor being used by changing capacitance by application of direct current voltage Vdc and high-frequency voltage Vrms across the electrodes, wherein, when an effective voltage value of high-frequency voltage Vrms is within a range of voltage values of direct current voltage Vdc, there is substantially no fluctuation caused by application of high-frequency voltage Vrms with respect to a change of the capacitance caused by application of direct current voltage Vdc.

Further, in the invention, wherein when the direct current voltage Vdc is within a range of 1 to 4 V, a ratio ($C_{4.0\ dc}/C_{1.0\ dc}$) between capacitance $C_{1.0}$ dc in the case of Vdc= 1 V and capacitance $C_{4.0}$ dc in the case of Vdc–4 V is 0.25 to 0.85, and in a frequency range of 100 MHz to 10 GHz, a ratio ($C_{4.0\ rms}/C_{0.1\ rms}$) between capacitance $C_{0.1\ rms}$ in the case of a high-frequency voltage Vrms–0.1 V and capacitance $C_{4.0\ rms}$ in case of the high-frequency voltage Vrms–4 V is 0.95 to 1.05.

Still further, in the invention, a plurality of variable capacitor elements using a dielectric material whose dielectric constant changes through voltage application are connected to each other in series, and the direct current voltage is applied to each of the variable capacitor elements connected in series.

Still further, in the invention, a plurality of varactor diodes are connected to each other in series, and the direct current voltage is applied to each of the varactor diodes connected in series.

In the invention, the dielectric material whose dielectric constant is changed by voltage application is made of perovskite-type oxide crystal grains containing at least Ra, Sr and Ti.

According to the invention, it is possible to decrease susceptibility to high-frequency voltage of the capacitor, therefore it is possible to obtain a variable capacitor such that nonlinear distortion is small and power handling capability is high.

According to the invention, an operation with a low direct current voltage is enabled, therefore it is possible to obtain a variable capacitor such that an expensive boosting circuit is not used, a direct current voltage supply circuit can be small-size and low-price, nonlinear distortion is small and power handling capability is high.

According to the invention, it is possible to use a material of low dielectric loss as a dielectric, therefore it is possible to obtain a variable capacitor such that a Q is high, nonlinear distortion is small and power handling capability is high.

According to the invention, it is possible to produce in large quantities by the use of a semiconductor process, so that it is possible to obtain a variable capacitor such that the price is low, nonlinear distortion is small and power handling capability is high.

According to the invention, by using the perovskite-type oxide crystal grains as a dielectric material, the dielectric layer is obtained which is low-loss and has a high dielectric constant and a large capacitance change rage. Therefore, a variable capacitor having a large capacitance and a large capacitance change rate can be realized.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
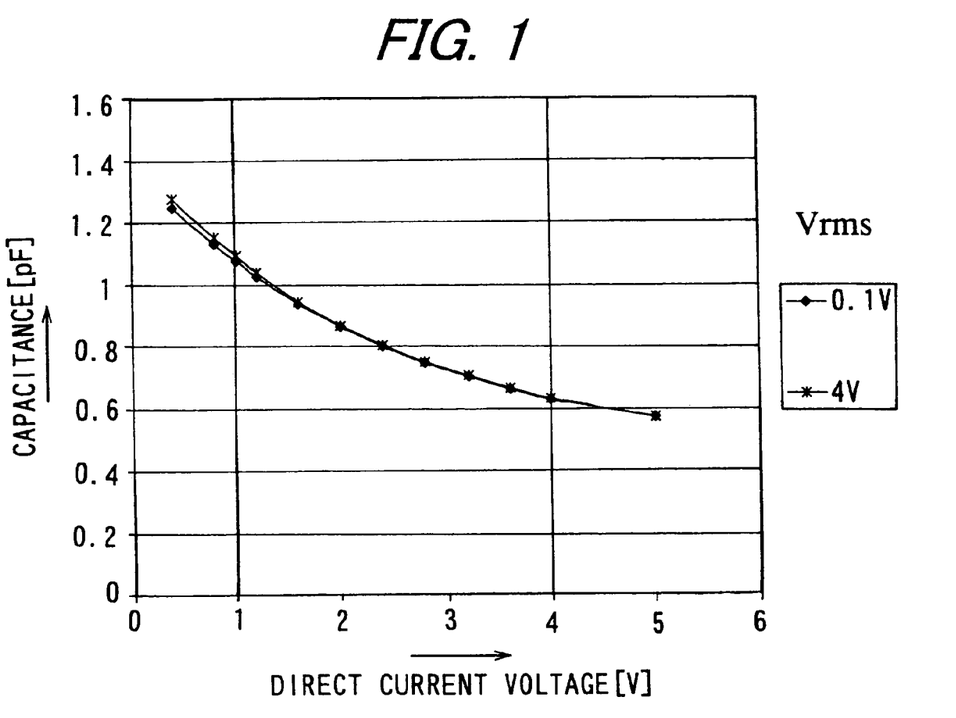
FIG. 1 is a chart showing a voltage dependence of capacitance of a variable capacitor according to one embodiment of the invention.

Below, regarding a variable capacitor according to one embodiment of the invention, an example of a voltage dependence of capacitance thereof will be shown in FIG. 1 by a chart similar to FIG. 7. In FIG. 1, the horizontal axis, the vertical axis, characteristic curves and the like are the same as in FIG. 7. That is, in FIG. 1 by a chart, the horizontal axis represents a direct current voltage (unit: V) of the external control voltage, the vertical axis represents capacitance (unit: pF), black diamond points and a characteristic curve thereof show a change of capacitance when an effective voltage Vrms of a high-frequency voltage of the external control voltage is 0.1 V, and asterisk points and a characteristic curve thereof show a change of capacitance when the effective voltage Vrms of the high-frequency voltage is 4 V. As apparent from the voltage dependence of capacitance shown in FIG. 1, the variable capacitor of the invention is such that, for example, in a case where capacitance changes through application of direct current voltage in a voltage value range up to 5 V, when a high-frequency voltage of an effective voltage value within the voltage value range is applied repeatedly, the capacitance largely changes in accordance with application of the direct current voltage in the same manner as in the related art when an effective voltage Vrms of a high frequency voltage is as low as 0.1 V, and also largely changes in accordance with application of the direct current voltage almost in the same manner when the effective voltage Vrms of the high-frequency voltage is as high as 4 V, and therefore, there is substantially no fluctuation caused by application of high-frequency voltage. In other words, the variable capacitor of the invention is such that in a case where a high frequency voltage of a low effective voltage value within a range of voltage values of direct current voltage, for example, Vrms of 0.1 V is applied, capacitance decreases in a monotone when the direct current voltage becomes large, and a large change amount is obtained, and also in a case where a high-frequency voltage of a high effective voltage value within a range of voltage values of direct current voltage, for example, Vrms of 4 V is applied, the direct current voltage dependence of capacitance that there is substantially no fluctuation is exhibited as well.

In this example, when a direct current voltage Vdc is within a range of 1 to 4 V, a ratio ($C_{4.0\ dc}/C_{1.0\ dc}$) between capacitance $C_{1.0\ dc}$ in the case of Vdc=1 V and capacitance $C_{4.0\ dc}$ in the case of Vdc=4 V is 0.59, and in measurement in a frequency range of 1 GHz, a ratio ($C_{4\ rms}/C_{0.1\ rms}$) between capacitance $C_{0.1\ rms}$ in the case of Vrms=0.1 V and capacitance $C_{4.0\ rms}$ in the case of Vrms=4 V is in a range of 0.98 to 1.02.

It is preferred that the ratio ($C_{4.0\ dc}/C_{1.0\ dc}$) between capacitance $C_{1.0\ dc}$ in the case of Vdc=1 V and capacitance $C_{4.0\ dc}$ in the case of Vdc=4 V is in a range of 0.25 to 0.85. This is because a variable rate of capacitance required for frequency adjustment or the like in an electronic circuit that uses the variable capacitor of the invention is 15% at the minimum ($C_{4.00\ dc}/C_{1.0\ dc}=0.85$). On the other hand, it becomes easy to control for frequency adjustment when the variable rate is increased, but a high electric field strength is required for that, and dielectric breakdown easily occurs in a dielectric layer of a capacity forming portion. Therefore, the upper limit of the variable rate is 75% ($C_{4.0\ dc}/C_{1.0\ dc}=0.25$).

Further, in a case where the ratio ($C_{4.0\ rms}/C_{0.1\ rms}$) between capacitance $C_{0.1\ rms}$ in the case of Vrms=0.1 V and capacitance $C_{4.0\ rms}$ in the case of Vrms=4 V in a frequency range of 100 MHz to 10 GHz is 0.95 to 1.05, it is sufficient for frequency control. For example, resonance frequency $f_0$ of an LC resonance system can be expressed by the following expression:

$$f_0 = 1/2 \cdot \pi \sqrt{L} \cdot \sqrt{C}$$

Here, in a case where capacitance C increases 5%, resonance frequency $f_1$ is:

$$f_1 = 1/2 \cdot \pi \sqrt{L} \cdot \sqrt{1.05 C} = f_0/\sqrt{1.05} = f_0/1.025 = 0.976 f_0$$

it corresponds to 2.5% decrease of resonance frequency. Furthermore, in a frequency controlling LC circuit, fixed capacitors containing stray capacitor other than the variable capacitor are connected in series and in parallel, and synthetic capacitance of capacitance of the variable capacitor and capacitance of the fixed capacitors determine resonance frequency. Therefore, even when the capacitance C increases 5%, a change of resonance frequency is substantially the same, and there is substantially no problem for use within this range.

Next, the variable capacitor of the invention that realizes the voltage dependence of capacitance will be described in detail by the use of drawings that schematically show a structure of one embodiment.

Figure 2:
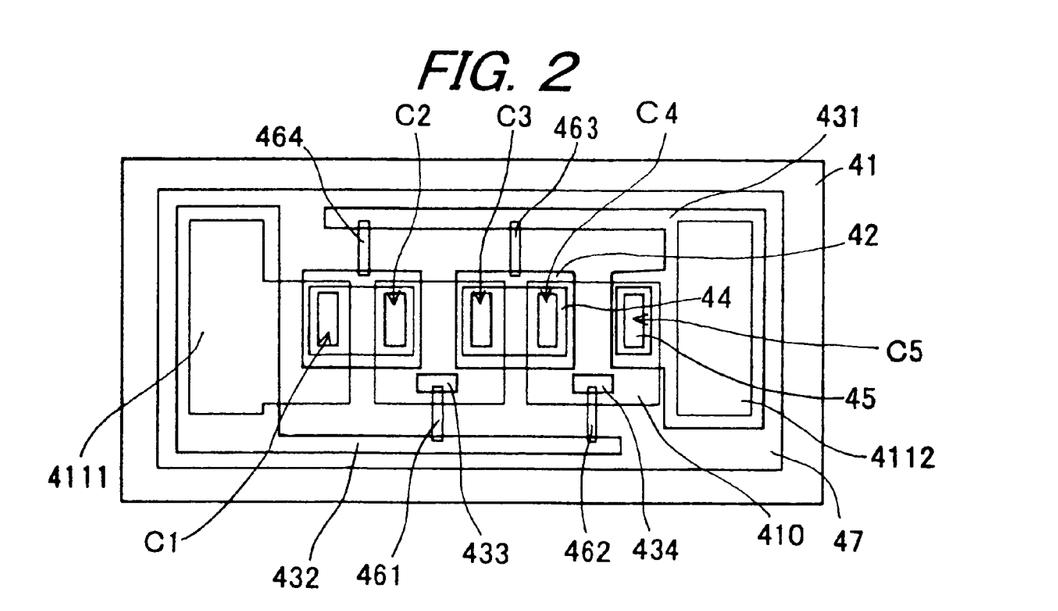
FIG. 2 is a transparent plan view showing the variable capacitor according to one embodiment of the invention.
Figure 3:
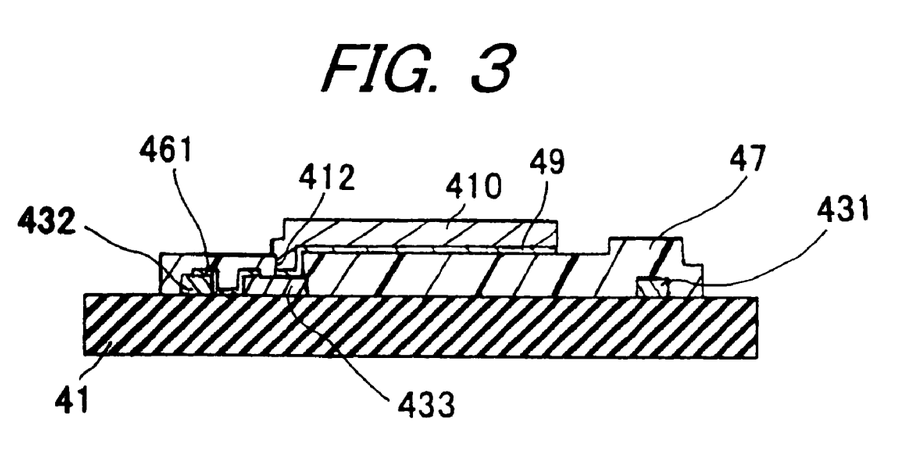
FIG. 3 is a cross section view showing the variable capacitor according to one embodiment of the invention.
Figure 4:
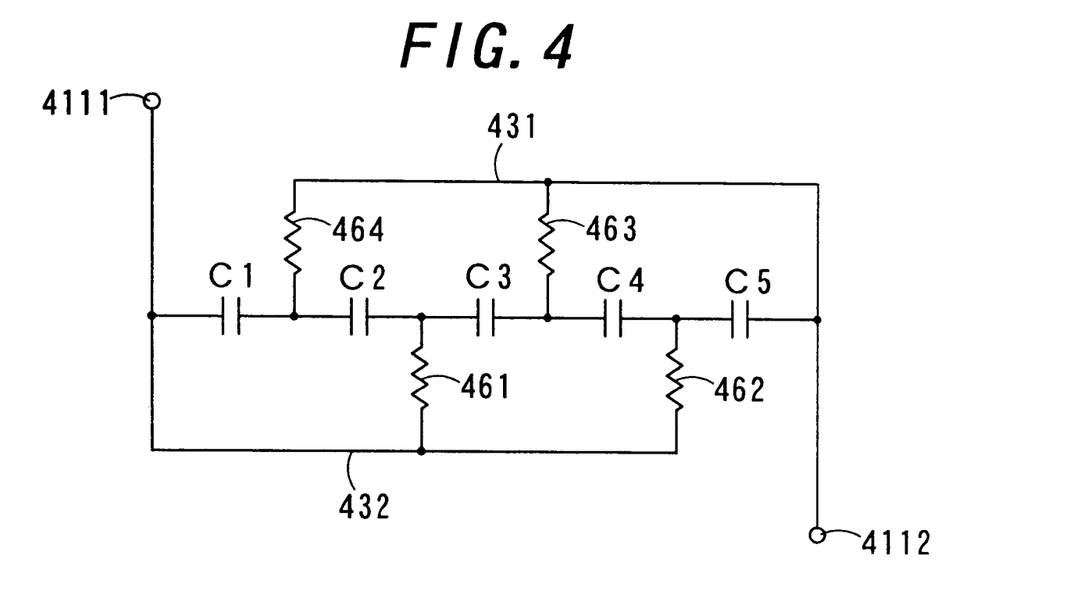
FIG. 4 is an equivalent circuit view of the variable capacitor showing FIG. 2.

FIG. 2 is a transparent plan view that schematically shows a structure of the variable capacitor according to one embodiment of the invention, and FIG. 3 is a cross section view thereof. FIG. 4 is an equivalent circuit view of the variable capacitor showing the FIG. 2. In FIGS. 2 to 4, the variable capacitor includes a supporting substrate 41, a lower electrode layer 40, conductor lines 431, 432, 433 and 434, a dielectric layer 44, an upper electrode layer 45, thin film resistors 461, 462, 463 and 464, an insulating layer 47, a first extraction electrode layer 49, a second extraction electrode layer 410, and connecting terminal portions 4111 and 4112 with an external circuit. Moreover, reference numerals C1 to C5 denote capacity forming portions, and capacitances thereof change depending on the magnitude of a controlling direct current bias voltage and a signal high-frequency voltage, respectively.

The variable capacitor of the invention is formed as follows. The lower electrode layer 42, the dielectric layer 44 and the upper electrode layer 45 are sequentially deposited and formed on the supporting substrate 41, and processed into desired shapes.

The dielectric layer 44 is made of a dielectric material whose dielectric constant is changed by voltage application. In concrete, it is preferred that the dielectric layer 44 is made of a dielectric material having a high dielectric constant made of perovskite-type oxide crystal grains containing at least Ba, Sr and Ti. The dielectric layer 44 is formed on a top surface (i.e., an upper surface) of the lower electrode layer 42. For example, by targeting at a dielectric material from which perovskite-type oxide crystal grains can be obtained, deposition of the dielectric layer 44 by sputtering is executed until a desired thickness is obtained. On this occasion, by executing sputtering at a high substrate temperature, for example, at 800° C., it is possible to obtain the dielectric layer 44 which is low-loss and has a high dielectric constant and a large capacitance change rate, without executing an annealing after sputtering.

After sequentially depositing the upper electrode layer 45, the dielectric layer 44 and the lower electrode layer 42, and processing them into desired shapes, bias lines composed of the conductor lines 431, 432, 433 and 434 and the thin film resistors 461, 462, 463 and 464 are formed. A first bias line is composed of the conductor lines 432 and 433 and the thin film resistor 461. The first bias line is disposed from the external connecting terminal 4111 to a connection point between a second capacity forming portion C2 and a third capacity forming portion C3, that is, to an extraction electrode layer (composed of the first extraction electrode layer 49 and the second extraction electrode layer 410) connecting the upper electrode layer 45 of the second capacity forming portion C2 and the upper electrode layer 45 of the third capacity forming portion C3. In the same way, a second bias line is composed of the conductor lines 432 and 434 and the thin film resistor 462. The second bias line is disposed from the external connecting terminal 4111 to a connection point between a fourth capacity forming portion C4 and a fifth capacity forming portion C5, that is, to an extraction electrode layer (composed of the first extraction electrode layer 49 and the second extraction electrode layer 410) connecting the upper electrode layer 45 of the fourth capacity forming portion C4 and the upper electrode layer 45 of the fifth capacity forming portion C5.

Further, a third bias line is composed of the conductor line 431 and the thin film resistor 463. The third base line is disposed from the external connecting terminal 4112 to a connection point between the third capacity forming portion C3 and the fourth capacity forming portion C4, that is, to the lower electrode layer 42 that is shared by the third capacity forming portion C3 and the fourth capacity forming portion C4. In the same way, a fourth bias line is composed of the conductor line 431 and the thin film resistor 464. The fourth bias line is disposed from the external connecting terminal 4112 to a connection point between a first capacity forming portion C1 and the second capacity forming portion C2, that is, to the lower electrode layer 42 shared by the first capacity forming portion C1 and the second capacity forming portion C2.

The conductor lines 431, 432, 433 and 434 can be obtained by newly depositing after sequentially depositing the upper electrode layer 45, the dielectric layer 44 and the lower electrode layer 42 and processing them into desired shapes. On this occasion, it is desirable to use a liftoff method in order not to change the shapes of the lower electrode layer 42, the dielectric layer 44 and the upper electrode layer 45 that are formed in advance.

The conductor lines 431, 432, 433 and 434 are not necessarily formed in the above manner, and may be formed by the same material and in the same process as the lower electrode layer 42 as far as the lower electrode layer 42 is processed so as to have the shapes of the conductor lines.

It is desired that a material of the thin film resistors 461, 462, 463 and 464 composing the first to fourth bias lines has a specific resistance of 1 Ω·cm or more. By using such a high-resistance material, it becomes possible to make an aspect ratio small. Therefore, it is possible to produce without making the respective capacity forming portions (i.e., capacitative elements) to have larger shapes even when adding the bias lines, which is advantageous for miniaturization and integration. The material of the thin film resistors 461 to 464 is specifically tantalum nitride, TaSiN, Ta—Si—O and the like. For example, in the case of using tantalum nitride, it is possible to deposit a resistor film having desired composition ratio and resistivity by a reactive sputtering method of executing sputtering by adding a nitrogen gas while targeting at Ta (tantalum). By properly selecting the condition of sputtering, it is possible to produce a resistor film having a specific resistance of 10 Ω·cm or more. Furthermore, it is possible to, after sputtering, apply resist and process it into a predetermined shape, and therefore, execute patterning with ease by an etching process such as reactive ion etching (RIE).

The resistance values of the first to fourth bias lines are set so that the impedances of the bias lines become larger than impedances of the respective capacity forming portions in a frequency range to be used. Then, in the example shown in FIG. 2, the resistance values of the conductor lines 431, 432, 433 and 434 become considerably small as compared with the resistance values of the thin film resistors 461, 462, 463 and 464, so that the resistance values of the respective bias lines become substantially equal to the resistance values of the respective thin film resistors 461, 462, 463 and 464. Therefore, the resistance values of the thin film resistors 461, 462, 463 and 464 are set so as to become larger than the impedances of the respective capacity forming portions in a frequency range to be used. For example, in the case of using the variable capacitor at a frequency of 1 GHz, and setting capacitances of the respective capacity forming portions C1 to C5 to 5 pF, it is assumed that the resistance values of the thin film resistors 461, 462, 463 and 464 are set to 10 times or more of the impedance at 100 MHz of the respective capacity forming portions C1 to C5 so that the impedances are not affected by the frequency (100 MHz) that is one tenth of 1 GHz. In this case, the necessary resistance values of the thin film resistors 461, 462, 463 and 464 become approximately 3.2 kΩ or more. On the other hand, by forming the thin film resistors 461, 462, 463 and 464 by the use of the material having a specific resistance of 1 Ω·cm, they become thin film resistors of 10 kΩ, for example, even when film thickness is 50 nm and an aspect ratio is 50. Consequently, the thin film resistors 461, 462, 463 and 464 having a resistance value of 3.2 kΩ or more can be realized with ease.

Next, the insulating layer 47 is deposited, and the opening portion is formed. As shown in FIG. 3, the insulating layer 47 is provided with the through hole 412 that exposes parts of the conductor lines 433 and 434, in order to secure connection between the thin film resistors 461 and 462 and the extraction electrode layers. The through hole 412 is formed in the same process as the opening portion. Furthermore, it is preferred from the point of view of increase of moisture resistance that portions exposed from the insulating layer 47 of the upper surfaces of the conductor lines 433 and 434 are only the opening portion, the through hole 412, and the connecting portions 4111 and 4112 with an external circuit.

Next, the extraction electrode layer composed of the first extraction electrode layer 49 and the second extraction electrode layer 410 is formed. The extraction electrode layer couples the upper electrode layer 45 of the first capacity forming portion C1 and the external connecting terminal portion 4111, or couples the upper electrode layers 45 to each other, thereby connecting the first capacity forming portion C1 to the terminal forming portion 4111, as well as connectors the second capacity forming portion C2 and the third capacity forming portion C3 in series and connects the fourth capacity forming portion C4 and the fifth capacity forming portion C5 in series. Furthermore, the extraction electrode layer stretched across C2 and C3 and the extraction electrode layer stretched across C4 and C5 are connected to the conductor lines 433 and 434, respectively, via the through hole 412 of the insulating layer 47.

In the invention, by connecting the capacity forming portions C1 to C5 to each other in series, it is possible to decrease susceptibility to a high-frequency voltage of the capacitor. When the capacity forming portions are connected to each other in series, a high-frequency voltage applied to each of the capacity forming portions decreases. For example, in a circuit arrangement shown in FIG. 4, five capacity forming portions C1 to C5 which have the same capacity are connected to each other in series. In this case, the magnitude of a high-frequency voltage applied to each capacity forming portion becomes one fifth (⅕) of a high-frequency voltage applied across the external connecting terminals 4111 and 4112. In this way, by decreasing a high-frequency voltage applied to each capacity forming portion, it is possible to decrease susceptibility to a high-frequency voltage of the capacitor.

The variable capacitor thus structured exhibits the voltage dependence of capacitance as shown in FIG. 1. That is, in the case of applying a high-frequency voltage of a low effective voltage value, for example, Vrms of 0.1 V within a range of a voltage value of a direct current voltage, capacitance decreases in a monotone when the direct current voltage increases, and a large change amount can be obtained. On the other hand, in the case of applying a high-frequency voltage of a high effective voltage value, for example, Vrms of 4 V, capacitance decreases in a monotone in the same manner, and a large change amount can be obtained, with the result that a direct current voltage dependence of capacitance such that there is substantially no fluctuation caused by application of high-frequency voltage is exhibited.

Figure 5:
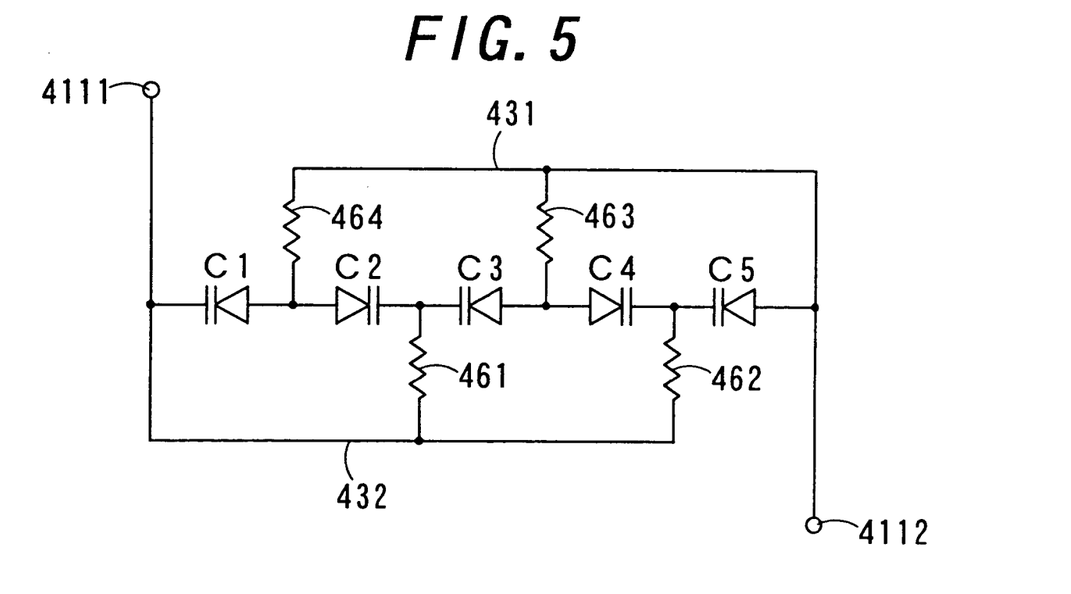
FIG. 5 is an equivalent circuit view of a variable capacitor according to another embodiment of the invention.

FIG. 5 is an equivalent circuit view of the variable capacitor according to another embodiment of the invention. Further, the variable capacitor according to another embodiment of the invention may be structured with the same structure shown in the equivalent circuit view of FIG. 5 so that a plurality of varactor diodes are used as the capacity forming portions and connected to each other in series, and so that a direct current voltage can be applied to each of the varactor diodes.

In the case of using varactor diodes as the capacity forming portions, it must be noted that the varactor diodes are used in a state where polarities of the adjacent varactor diodes are reversed to each other.

In a circuit arrangement shown in FIG. 5, the varactor diode is regarded as a capacitor in the light of electric circuitry. Therefore, by connecting the varactor diodes to each other in series, a high-frequency voltage applied to each capacity forming portion is decreased, whereby it is possible to decrease susceptibility to a high-frequency voltage of the capacitor.

The variable capacitor of the invention structured as described above is capable of sufficiently meeting a practical level (for example, 50 dBm) because nonlinear distortion is small and, for example, IIP3 serving as one index is 60 dBm.

Furthermore, it is possible to decrease susceptibility of capacitance to a high-frequency voltage, so that dielectric breakdown of the capacity forming portion caused by application of high-frequency voltage also decreases, power handling capability becomes 35 dBm or more, and therefore, the variable capacitor can be used with high reliability even at transmission power (33 dBm at the maximum) used in radio communication equipment such as a mobile phone.

According to the variable capacitor of the invention produced as described above, a variable capacitor used by changing capacitance through application of a direct current voltage and a high-frequency voltage is structured so that there is substantially no fluctuation caused by application of high-frequency voltage with respect to a change of the capacitance caused by application of direct current voltage when an effective voltage value of the high-frequency voltage across electrodes is within a range of voltage values of direct current voltage. With the result that it is possible to decrease susceptibility to the high-frequency voltage of the capacitor, and therefore, it is possible to obtain a variable capacitor such that nonlinear distortion is small and power handling capability is high.

Further, according to the variable capacitor of the invention, in a case where the variable capacitor is structured so that a ratio ($C_{4.0\ dc}/C_{1.0\ dc}$) between capacitance $C_{1.0\ dc}$ in a case where Vdc is 1 V and capacitance $C_{4.0\ dc}$ in a case where Vdc is 4 V is 0.25 to 0.85 when a direct current voltage Vdc is in a range of 1 to 4 V, and so that a ratio ($C_{4.0\ rms}/C_{0.1\ rms}$) between capacitance $C_{0.1\ rms}$ in a case where a high-frequency voltage Vrms is 0.1 V and capacitance $C_{4.0\ rms}$ in a case where the high-frequency voltage Vrms is 4 V in a frequency range of 100 MHz to 10 GHz is within a range of 0.95 to 1.05. In this case, an operation with a low direct current voltage is enabled, with the result that it is possible to obtain a variable capacitor such that an expensive boosting circuit is not used, a direct current voltage supply circuit can be small-size and low-price, nonlinear distortion is small and power handling capability is high.

Further, according to the variable capacitor of the invention, when the variable capacitor is structured so that a plurality of variable capacitor elements using a dielectric material whose dielectric constant is changed by voltage application are connected to each other in series, and a direct current voltage is applied to each of the variable capacitor elements connected in series. In this case, it is possible to use a material of low dielectric loss as a dielectric, with the result that it is possible to obtain a variable capacitor such that a O is high, nonlinear distortion is small and power handling capability is high.

According to the variable capacitor of the invention, when the variable capacitor is structured so that a plurality of varactor diodes are connected to each other in series, and so that a direct current voltage is applied to each of the varactor diodes connected in series, it is possible to produce in large quantities by the use of a semiconductor process, with the result that it is possible to obtain a variable capacitor such that the price is low, nonlinear distortion is small and power handling capability is high.

According to the invention, by using the perovskite-type oxide crystal grains as a dielectric material, the dielectric layer is obtained which is low loss and has a high dielectric constant and a large capacity change rate. Therefore, a variable capacitor having a large capacitance and a large capacitance change rate can be realized.

The invention is not restricted to the embodiments described above, and may be altered in various manners within the scope of the invention. For example, the capacity forming portion is an overlay-type capacitor made of metal/dielectric/metal in the embodiments, but the capacitor of the capacity forming portion can also be a gap-type. In the case of a gap-type capacitor, the number of processes is less than that of the overlay-type capacitor, so that the gap-type capacitor is advantageous for production at a low price.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A variable capacitor comprising:
   electrodes, the variable capacitor being used by changing capacitance by application of direct current voltage Vdc and high-frequency voltage Vrms across the electrodes,
   wherein, when an effective voltage value of high-frequency voltage Vrms is with in a range from 1 to 4 V of voltage values of direct current voltage Vdc, there is substantially no fluctuation caused by application of high-frequency voltage Vrms with respect to a change of the capacitance caused by application of direct current voltage Vdc.

2. The variable capacitor of claim 1, wherein when the direct current voltage Vdc is within a range of 1 to 4 V, a ratio ($C_{4.0\ dc}/C_{1.0\ dc}$) between capacitance $C_{1.0\ dc}$ in the case of Vdc=1 V and capacitance $C_{4.0\ dc}$ in the case of Vdc=4 V is 0.25 to 0.85, and in a frequency range of 100 MHz to 10 GHz, a ratio ($C_{4.0\ rms}/C_{0.1\ rms}$) between capacitance $C_{0.1\ rms}$ in the case of a high frequency voltage Vrms=0.1 V and capacitance $C_{4.0\ rms}$ in case of the high-frequency voltage Vrms=4 V is 0.95 to 1.05.

3. The variable capacitor of claim 1, wherein a plurality of variable capacitor elements using a dielectric material whose dielectric constant changes through voltage application are connected to each other in series, and the direct current voltage is applied to each of the variable capacitor elements connected in series.

4. The variable capacitor of claim 1, wherein a plurality of varactor diodes are connected to each other in series, and the direct current voltage is applied to each of the varactor diodes connected in series.

5. The variable capacitor of claim 3, wherein the dielectric material whose dielectric constant is changed by voltage application is made of perovskite-type oxide crystal grains containing at least Ba, Sr and Ti.

* * * * *